US010027471B2

United States Patent
Tu et al.

(10) Patent No.: US 10,027,471 B2
(45) Date of Patent: Jul. 17, 2018

(54) SYNCHRONIZATION AND TRAINING STAGE OPERATION

(71) Applicant: BROADCOM CORPORATION, Irvine, CA (US)

(72) Inventors: Chung Ming Tu, Irvine, CA (US); Peiqing Wang, Laguna Beach, CA (US); Ahmad Chini, Mission Viejo, CA (US); Yencheng Chen, Fremont, CA (US); Mehmet Vakif Tazebay, Irvine, CA (US); Bazhong Shen, Irvine, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 187 days.

(21) Appl. No.: 14/795,840

(22) Filed: Jul. 9, 2015

(65) Prior Publication Data
US 2016/0365967 A1    Dec. 15, 2016

Related U.S. Application Data

(60) Provisional application No. 62/174,455, filed on Jun. 11, 2015.

(51) Int. Cl.
*H04L 7/10* (2006.01)
*H04L 12/413* (2006.01)
*H04L 7/04* (2006.01)

(52) U.S. Cl.
CPC .............. *H04L 7/10* (2013.01); *H04L 12/413* (2013.01); *H04L 7/048* (2013.01)

(58) Field of Classification Search
CPC .......... H04L 7/10; H04L 12/413; H04L 7/048
See application file for complete search history.

(56) References Cited

U.S. PATENT DOCUMENTS 5,745,529 A * 4/1998 Hikoso ................ H04B 1/7093
375/150
2006/0232377 A1* 10/2006 Witkowski ............. G08C 19/28
340/5.25
(Continued)

FOREIGN PATENT DOCUMENTS

EP          1916581 A2 *  4/2008   ......... G05B 19/0428

OTHER PUBLICATIONS

"Relationship of 1000BASE-T1 to Other Standards", IEEE 802, Mar. 2015, 6 pgs.
(Continued)

*Primary Examiner* — Omar J Ghowrwal
(74) *Attorney, Agent, or Firm* — McDermott Will & Emery LLP

(57) ABSTRACT

A primary device implementing the subject system of link establishment for single pair Ethernet may include at least one processor circuit. The at least one processor circuit may be configured to transmit a first synchronization sequence to a secondary device and to subsequently detect a second synchronization sequence, different than the first, transmitted by the secondary device. The synchronization sequences may be pseudo-noise sequences that have strong autocorrelation characteristics. The at least one processor circuit may be configured to wait a predetermined amount of time after completing the detection of the second synchronization sequence, and then may initiate a training stage. The training stage may include exchanging scrambler states of additive scramblers used by the primary and secondary devices. The at least one processor circuit may be configured to enter a data mode upon completion of training. In the data mode, data is forward error correction encoded and then scrambled.

20 Claims, 18 Drawing Sheets

(56) References Cited

U.S. PATENT DOCUMENTS

| | | | | |
|---|---|---|---|---|
| 2006/0233225 | A1* | 10/2006 | Omoto | H04L 7/042 |
| | | | | 375/149 |
| 2012/0263165 | A1* | 10/2012 | Zakrzewski | H04W 56/009 |
| | | | | 370/350 |
| 2015/0244604 | A1* | 8/2015 | Moreno | H04L 43/0882 |
| | | | | 370/252 |
| 2015/0381777 | A1* | 12/2015 | Dalmia | H04L 12/4013 |
| | | | | 370/475 |
| 2017/0013577 | A1* | 1/2017 | Berggren | H04B 7/2656 |

OTHER PUBLICATIONS

Desanti, "Physical Coding Sublayer (PCS)", Proposed FC-BaseT PCS, T11/06-026v2, May 2006, pp. 17-28.

Tazebay, "A Review of 1000BASE-T1 PHY Architecture for EMC-Constrained Channels", 2014 IEEE-SA Ethernet & IP Automotive Technology Day, Oct. 23, 2014, 21 pgs.

"Clause 40—1000BASE-T Physical Medium Attachment (PMA) Sublayer", University of New Hampshire Interoperability Laboratory, retrieved from <https://www.iol.unh.edu/sites/default/files/knowledgebase/ge/1000BASE-T_PMA_>, Jul. 2004, 60 pgs.

\* cited by examiner

InfoField Messages - Primary Device

| PMA States | PMA_state <7:6> | Loc_rcvr_status | En_slave_tx | Ld_scr_seed | Ack_scr_seed | Set_data_sw_pfc | Ack_data_sw_pfc |
|---|---|---|---|---|---|---|---|
| PMA_Train_Init_M | 00 | 0 | 0 | 0 | 0 | 0 | 0 |
| PMA_Train_Init_M | 00 | 0 | 1 | 0 | 0 | 0 | 0 |
| PMA_Train_Init_M | 00 | 1 | 1 | 0 | 0 | 0 | 0 |
| PMA_ScrSeed_Exchange | 01 | 1 | 1 | 1 | 0 | 0 | 0 |
| PMA_ScrSeed_Exchange | 01 | 1 | 1 | 0 | 1 | 0 | 0 |
| PMA_ScrSeed_Exchange | 01 | 1 | 1 | 1 | 1 | 0 | 0 |
| PMA_DataSwPfc_Exchange | 10 | 1 | 1 | 0 | 1 | 0 | 0 |
| PMA_DataSwPfc_Exchange | 10 | 1 | 1 | 0 | 1 | 1 | 1 |
| PMA_DataSwPfc_Exchange | 10 | 1 | 1 | 0 | 1 | 0 | 1 |
| PMA_Sw_to_Data | 11 | 1 | 1 | 0 | 1 | 0 | 1 |

InfoField Messages - Secondary Device

| PMA States | PMA state <7:6> | Loc_rcvr_ status | Timing_lock_ ok | Ld_scr_ seed | Ack_scr_ seed | Set_data_ sw_pfc | Ack_data_ sw_pfc |
|---|---|---|---|---|---|---|---|
| PMA_Train_Init_S | 00 | 0 | 0 | 0 | 0 | 0 | 0 |
| PMA_Train_Init_S | 00 | 0 | 1 | 0 | 0 | 0 | 0 |
| PMA_Train_Init_S | 00 | 1 | 1 | 0 | 0 | 0 | 0 |
| PMA_ScrSeed_Exchange | 01 | 1 | 1 | 1 | 1 | 0 | 0 |
| PMA_ScrSeed_Exchange | 01 | 1 | 1 | 0 | 1 | 0 | 0 |
| PMA_ScrSeed_Exchange | 01 | 1 | 1 | 1 | 1 | 0 | 0 |
| PMA_DataSwPfc_Exchange | 10 | 1 | 1 | 0 | 1 | 1 | 0 |
| PMA_DataSwPfc_Exchange | 10 | 1 | 1 | 0 | 1 | 0 | 1 |
| PMA_DataSwPfc_Exchange | 10 | 1 | 1 | 0 | 1 | 1 | 1 |
| PMA_Sw_to_Data | 11 | 1 | 1 | 0 | 1 | 0 | 1 |
| ↑1402 | ↑1404 | ↑1406 | ↑1408 | ↑1410 | ↑1412 | ↑1414 |

FIG. 14

SYNCHRONIZATION AND TRAINING STAGE OPERATION

CROSS-REFERENCE TO RELATED APPLICATIONS

The present application claims the benefit of U.S. Provisional Patent Application Ser. No. 62/174,455, entitled "Link Establishment for Single Pair Ethernet," filed on Jun. 11, 2015, which is hereby incorporated by reference in its entirety for all purposes.

TECHNICAL FIELD

The present description relates generally to a link establishment, including link establishment for single pair Ethernet.

BACKGROUND

The Ethernet networking protocol has become one of the most common networking protocols in use today. Due to the wide availability of Ethernet, and its large install base, Ethernet is generally able to provide a greater cost performance than other networking protocols. Accordingly, there has been a recent demand for implementations of Ethernet interfaces across a wide array of industries. Ethernet transmissions generally transmit data over at least one twisted pair of wires. A twisted pair of wires, or a "twisted pair," may refer to a type of cabling where two conductors of a single circuit are twisted together. Single pair Ethernet may refer to Ethernet transmissions over a single twisted pair of wires.

Some single pair Ethernet applications, such as automotive Ethernet over unbalanced and unshielded twisted pair cables, may be subject to severe noise degradations, such as from narrow-band interference and/or unpredictable burst noises. The noise degradations may cause corruptions during link synchronization and/or training Corruptions during link synchronization and/or training may result in unrecoverable errors, such as failure to detect a link partner or to initialize a scrambler, and/or may result in corrupted synchronization/training messages that require retransmissions and thereby lengthen the link establishment time.

BRIEF DESCRIPTION OF THE DRAWINGS

Certain features of the subject technology are set forth in the appended claims. However, for purpose of explanation, several embodiments of the subject technology are set forth in the following figures.

FIG. 13 illustrates a table of example information field message identifier values transmitted by a primary electronic device during a training stage of link establishment for single pair Ethernet in accordance with one or more implementations.

FIG. 14 illustrates a table of example information field message identifier values transmitted by a secondary electronic device during a training stage of link establishment for single pair Ethernet in accordance with one or more implementations.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
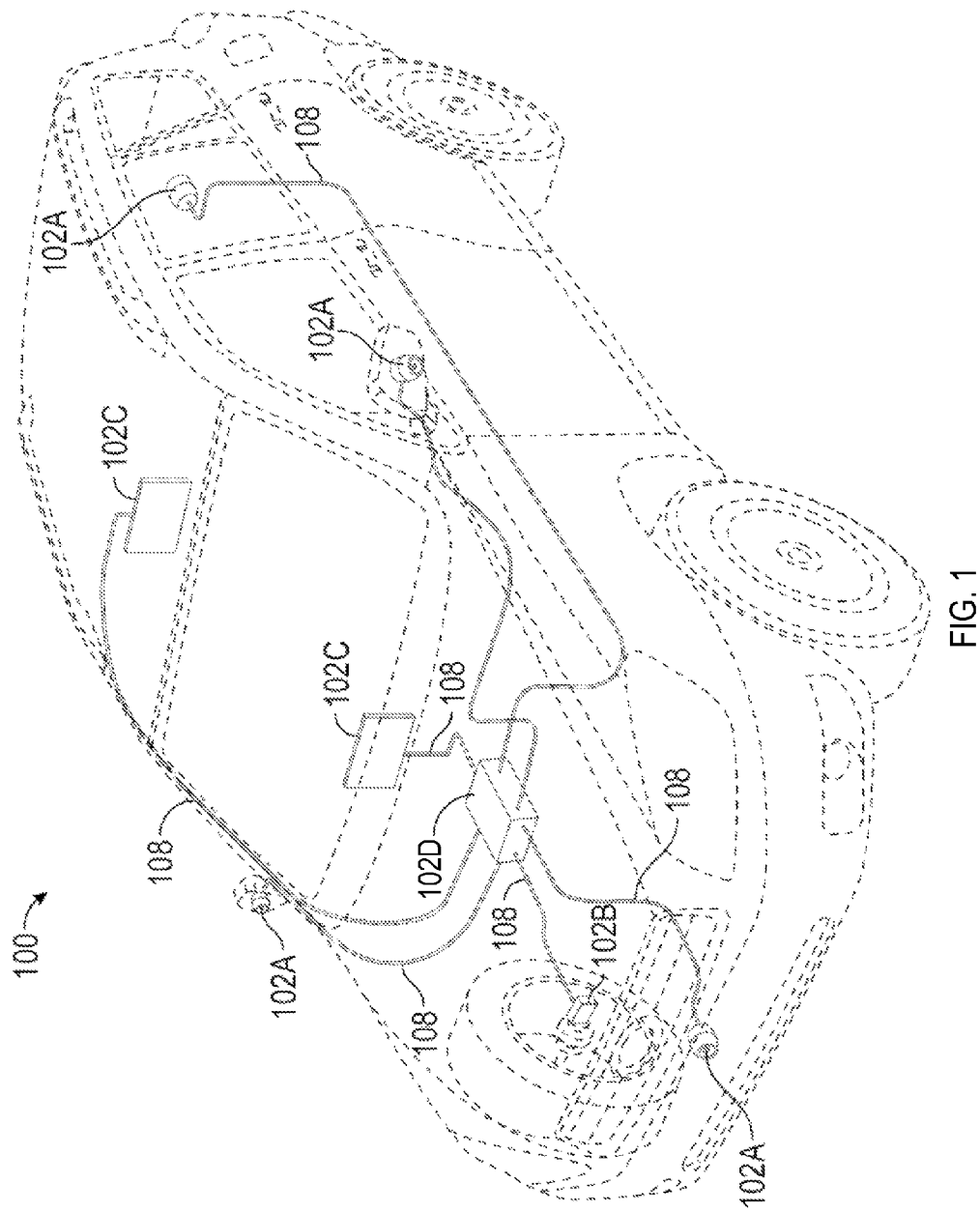
FIG. 1 illustrates an example network environment in which link establishment for single pair Ethernet may be implemented in accordance with one or more implementations.

FIG. 1 illustrates an example network environment 100 in which link establishment for single pair Ethernet may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a number of electronic devices 102A-C that are coupled to an electronic device 102D via transmission lines 108. The electronic device 102D may communicably couple the electronic devices 102A-C to one another. In one or more implementations, one or more of the electronic devices 102A-C are communicatively coupled directly to one another, such as without the support of the electronic device 102D. In one or more implementations, one or more of the transmission lines 108 are Ethernet transmission lines, such as one or more twisted pairs of wires. The electronic device 102D may be, or may include, a switch device, a routing device, a hub device, or generally any device that may communicably couple the electronic devices 102A-C. One or more of the electronic devices 102A-D may be, and/or may include all or a portion of, the electronic system 1800 discussed below with respect to FIG. 18.

In one or more implementations, at least a portion of the example network environment 100 is implemented within a vehicle, such as a passenger car. For example, the electronic devices 102A-D may include, and/or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 1, the electronic devices 102A are depicted as camera devices, such as forward-view, rear-view and side-view cameras, the electronic device 102B is depicted as a sensor, the electronic devices 102C are depicted as entertainment systems, and the electronic device 102D is depicted as a switch device that may include and/or may be coupled to a central on-board diagnostics system. In one or more implementations, one or more of the electronic devices 102A-D may be communicatively coupled to a public communication network, such as the Internet.

The electronic devices 102A-D each implements a physical layer (PHY) that is interoperable with one or more aspects of one or more physical layer specifications, such as those described in the Institute of Electrical and Electronics Engineers (IEEE) 802.3 Standards (e.g., 802.3bp). One or more of the electronic devices 102A-D, such as the electronic device 102D may be configured to operate as a primary (or "master") device, and one or more of the remaining electronic devices 102A-C, such as the electronic device 102A, may be configured to operate as a secondary (or "slave") device. A primary device provides reference clock timing in the system while the secondary devices need to recover the clock frequency from the primary device. For explanatory purposes, the electronic device 102D is primarily described herein as being configured as a primary device, and the electronic device 102A is primarily described herein as being configured as a secondary device. However, one or more of the other electronic devices 102A-C may be configured as the primary device, and the electronic device 102D may be configured as a secondary device.

In operation, a primary electronic device 102D may initiate a link establishment with a secondary electronic device 102A, such as across a single twisted pair of wires, e.g. single pair Ethernet. The electronic devices 102A,D perform a synchronization stage and a training stage to establish the link over single pair Ethernet, and then the electronic devices 102A,D enter a data mode for data transmissions. The link establishment is discussed further below with respect to FIGS. 3-14 and the subsequent data mode is discussed further below with respect to FIGS. 15-17.

Figure 2:
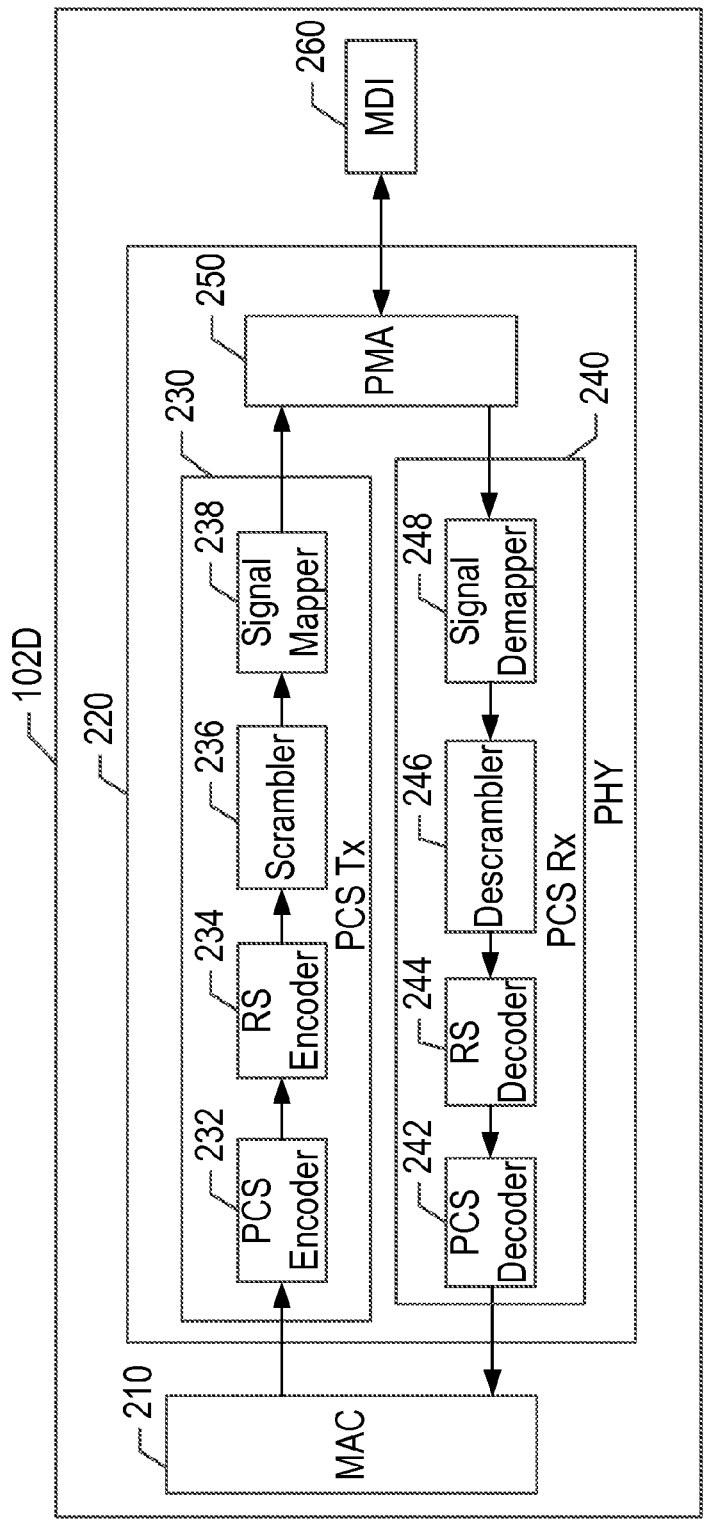
FIG. 2 illustrates an example electronic device that may implement link establishment for single pair Ethernet in accordance with one or more implementations.

FIG. 2 illustrates an example electronic device 102D that may implement link establishment for single pair Ethernet in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example electronic device 102D includes a media access control (MAC) module 210, a physical layer (PHY) module 220, and a medium dependent interface (MDI) 260. The PHY module 220 includes a physical coding sublayer (PCS) transmit (Tx) module 230, a PCS receive (Rx) module 240, and a physical medium attachment (PMA) module 250. In one or more implementations, the PCS Tx module 230 and the PCS Rx module 240 may be combined in a single PCS module. The PCS Tx module 230 includes a PCS encoder 232, a Reed Solomon (RS) encoder 234 (e.g. 450, 406, m=9), a scrambler 236, and a signal mapper 238. The PCS Rx module 240 includes a PCS decoder 242, an RS decoder 244, a descrambler 246, and a signal demapper 248. The RS encoder 234 and RS decoder 244 may also be referred to as a forward error correction (FEC) encoder and decoder, respectively.

The MAC module 210 is communicatively coupled to the PHY module 220 via an interface, such as a gigabit medium independent interface (GMII), or any other interface, over which data is communicated between the MAC module 210 and the PHY module 220. The PCS encoder 232 performs one or more encoding and/or transcoding functions on data received from the MAC module 210, such as 80b/81b line encoding. The RS encoder 234 performs RS encoding on the data received from the PCS encoder 232. The scrambler 236 is an additive or synchronous scrambler such that bit errors will not result in descrambler re-synchronization, as may be the case for multiplicative scramblers. The scrambler 236 is placed after the RS encoder 234 and scrambles the RS encoded data by performing an exclusive-or (XOR) operation on the RS encoded data and a scrambling sequence. In one or more implementations, the scrambler 236 is always enabled throughout normal data mode, low power idle mode (while the RS encoder 234 is active), and low power idle refresh mode (when the RS encoder 234 is inactive). In the LPI refresh mode, the reference scrambler sequence can be regenerated for improved performance. The signal mapper 238 maps the scrambled data to symbols, such as by mapping 3-bits to 2-ternary PAM symbols (3B/2T), or generally any bit to symbol mapping. The symbols are then passed to the PMA module 250.

The PMA module 250 performs one or more functions to facilitate uncorrupted data transmission, such as adaptive equalization, echo and/or crosstalk cancellation, automatic gain control (AGC), etc. The MDI 260 provides an interface from the PHY module 220 to the physical medium used to carry the data, e.g. the transmission lines 108, to the secondary electronic device 102A. The bit ordering used for the PCS Tx module 230 is discussed further below with respect to FIGS. 15 and 16.

The PMA module 250 receives symbols transmitted over the transmission lines 108, e.g. from the secondary electronic device 102A, via the MDI 260 and provides the symbols to the PCS Rx module 240. The signal demapper 248 maps the symbols to scrambled bits, such as by demapping 3-bits from 2-ternary PAM symbols. The descrambler 246 descrambles the scrambled bits using scrambler synchronization information received from the secondary electronic device 102A, such as a scrambler seed that was provided by the secondary electronic device 102A during the training stage. The RS decoder 244 performs RS decoding on the descrambled data, and the PCS decoder 242 performs one or more decoding and/or transcoding functions on data received from the RS decoder 244, such as 80b/81b line decoding. The PCS decoder 242 transmits the decoded data to the MAC module 210. The bit ordering used for the PCS Rx module 240 is discussed further below with respect to FIG. 17.

In one or more implementations, one or more of the MAC module 210, the PHY module 220, the PCS Tx module 230, the PCS encoder 232, the RS encoder 234, the scrambler 236, the signal mapper 238, the PCS Rx module 240, the PCS decoder 242, the RS decoder 244, the descrambler 246, the signal demapper 248, the PMA module 250, the MDI 260, or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
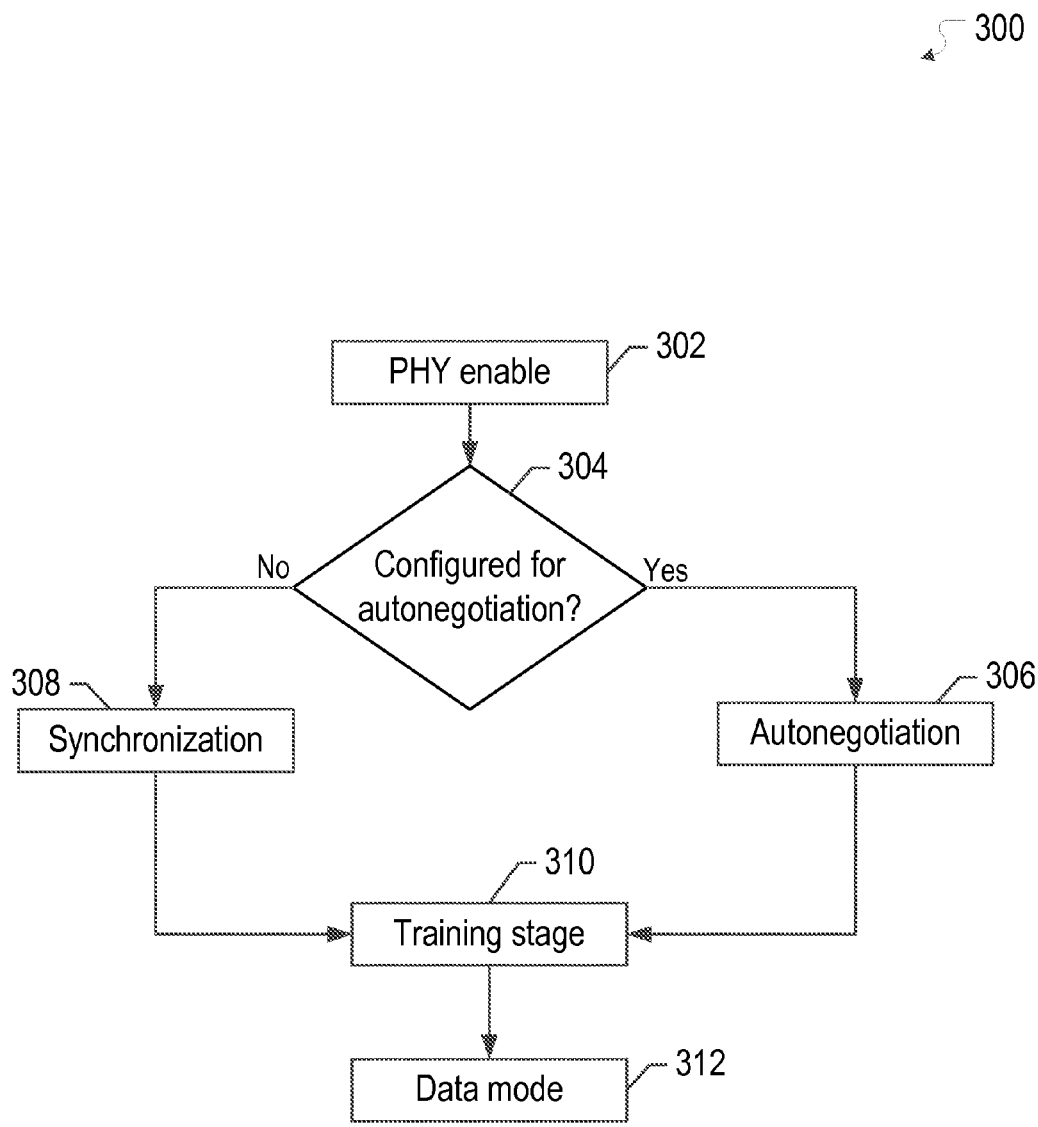
FIG. 3 illustrates a flow diagram of an example process of link establishment for single pair Ethernet in accordance with one or more implementations.

FIG. 3 illustrates a flow diagram of an example process of link establishment for single pair Ethernet in accordance with one or more implementations. For explanatory purposes, the example process 300 is described herein with reference to the electronic devices 102A,D of FIG. 1; however, the example process 300 is not limited to the electronic devices 102A,D of FIG. 1, and the example process 300 may be performed by one or more components of one or more of the electronic devices 102A,D. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed.

The link establishment for single pair Ethernet is initiated when the PHY is enabled for one or more of the primary and secondary electronic devices 102A,D, such as the PHY module 220 of the primary electronic device 102D (302). If the electronic devices 102A,D are configured for autonegotiation (304), the electronic devices 102A,D initiate and perform the autonegotiation, e.g. using differential Manchester encoding (DME) (306). If the electronic devices 102A,D are not configured for autonegotiation (304), the electronic devices 102A,D initiate and perform the synchronization/detection stage of the subject system for link establishment for single pair Ethernet (308). The synchronization stage provides a fast and robust synchronization that supports multiple timers, including a link_fail_inhibit_timer and a maxwait_timer. In one or more implementations, the primary/secondary device assignments are pre-configured for the synchronization stage.

In the synchronization stage (308), the electronic devices 102A,D utilize synchronization sequences, e.g. special periodic PAM2 sequences and/or pseudo-noise sequences with strong correlation properties/characteristics, to ensure detection under the worst case narrow-band interference and/or burst noise conditions. For example, the electronic devices 102A,D each transmits its own 255-state pseudo-noise (PN) sequence based on its own eighth degree polynomial according to the preconfigured primary/secondary device assignments for the synchronization stage. The electronic devices 102A,D may utilize matched filter-based correlators for PN sequence detection. The synchronization stage (308) is discussed further below with respect to FIGS. 4-7.

Once the synchronization stage (308), or the autonegotiation (306), is completed, the primary electronic device 102D initiates the training stage (310), e.g. a PAM2 training stage, and the electronic devices 102A,D transition through PAM2 states based on message exchanges and/or partial Reed-Solomon frame (PFC) counts. Once both of the electronic devices 102A,D have converged their respective receivers, the electronic devices 102A,D exchange scrambler initialization information, such as scrambler seed/state information. The electronic devices 102A,D also exchange data mode timing information that indicates the times that they will initialize their respective scramblers and switch to the data mode. Thus, based on the exchanged timing information, the electronic devices 102A,D may synchronize their scramblers and enter the data mode synchronously. The training stage is discussed further below with respect to FIGS. 8-14.

After completing the training stage (310) and switching to data mode (312), the electronic devices 102A,D perform Reed-Solomon (RS) forward error correction (FEC) encoding on data to be transmitted and subsequently scramble the encoded data, e.g. using the scramblers initialized during the training stage (310). The electronic devices 102A,D descramble received data, using their respective descramblers initialized with the other device's scrambler initialization information, and then perform RS decoding on the descrambled data. The data mode is discussed further below with respect to FIGS. 15-17.

Figure 4:
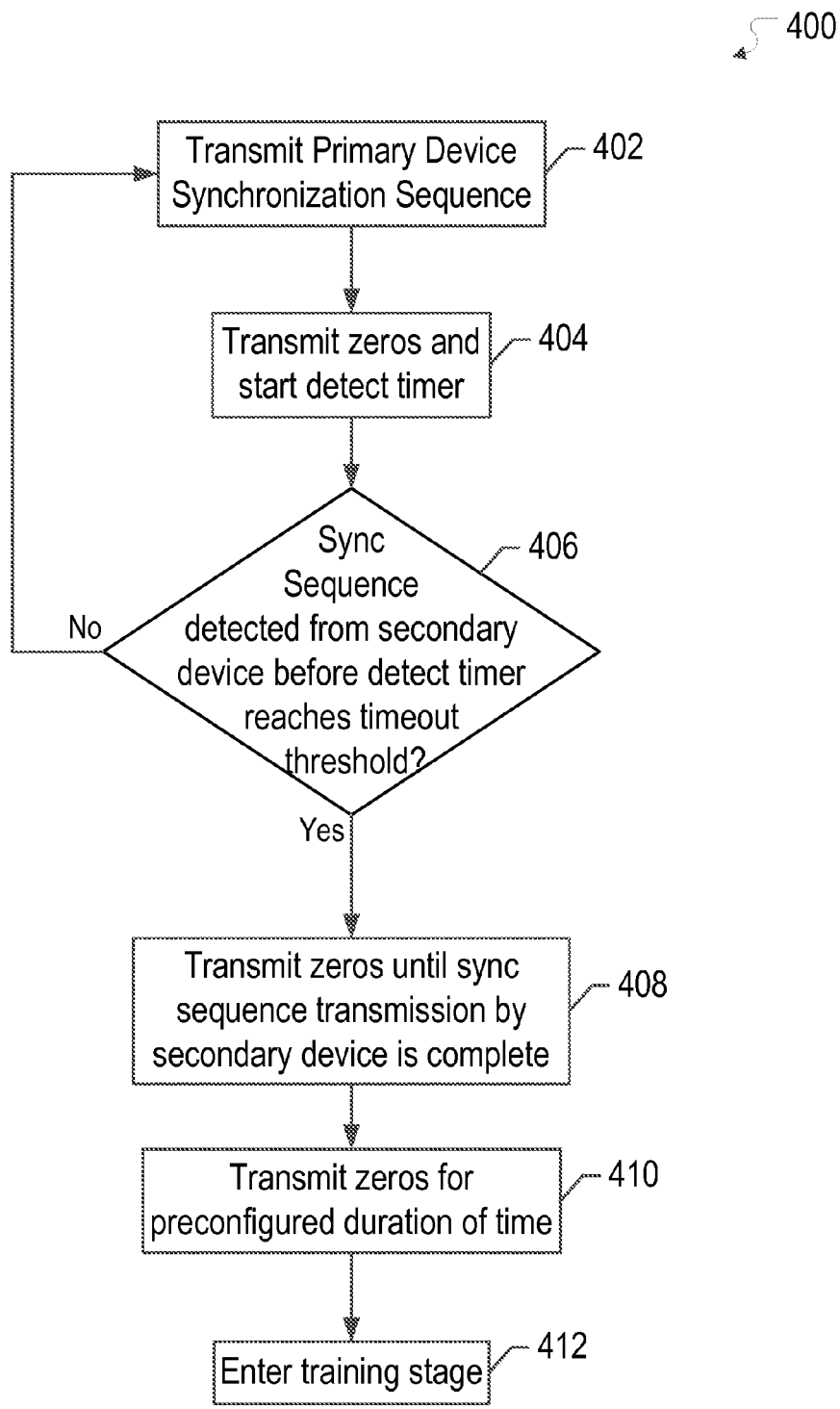
FIG. 4 illustrates a flow diagram of an example process of a primary electronic device in a synchronization stage of link establishment for single pair Ethernet in accordance with one or more implementations.

FIG. 4 illustrates a flow diagram of an example process 400 of a primary electronic device 102D in a synchronization stage of link establishment for single pair Ethernet in accordance with one or more implementations. For explanatory purposes, the example process 400 is primarily described herein with reference to the electronic device 102D of FIGS. 1-2; however, the example process 400 is not limited to the electronic device 102D of FIGS. 1-2, and the example process 400 may be performed by one or more components of the electronic device 102D. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

Upon entering the synchronization stage, the primary electronic device 102D transmits its primary device synchronization sequence (402). The primary device synchronization sequence is based on a wideband PAM-2 pseudo-noise (PN) sequence, such as a PN sequence with a period of 255 ($2^8-1$) and generally has a good/strong autocorrelation characteristic. The primary device synchronization sequence is specific to the primary electronic device 102D and is generated using an eighth degree polynomial that is specific to the primary electronic device 102D, such as $g_P(x)=1+x^2+x^3+x^4+x^8$. An example primary device synchronization sequence generator is discussed further below with respect to FIG. 6.

After transmitting the primary device synchronization sequence (402), the primary electronic device 102D transmits zeros, e.g. packets with no data, and initiates a detect timer (406). If the primary electronic device 102D does not detect the secondary device synchronization sequence prior to the detect timer reaching a timeout value (406), such as 4 microseconds, the primary electronic device 102D retransmits the primary device synchronization sequence (402), restarts the detect timer and continues transmitting zeros (404). In one or more implementations, the primary electronic device 102D may utilize a matched filter-based correlator to detect the secondary device synchronization sequence. If the primary electronic device 102D detects the secondary device synchronization sequence prior to the detect timer reaching the timeout value (406), the primary electronic device 102D continues to transmit zeros until the primary electronic device 102D no longer detects the secondary device synchronization sequence, e.g. until transmission of the secondary device synchronization sequence is completed by the secondary electronic device 102A (408).

The primary electronic device 102D then transmits zeros for a preconfigured duration of time that is pre-shared, or otherwise known by, the secondary electronic device 102A, such as a duration of four microseconds (410). The secondary electronic device 102A also transmits zeros for the preconfigured duration of time, such that both electronic devices 102A,D enter the training stage synchronously (412).

Figure 5:
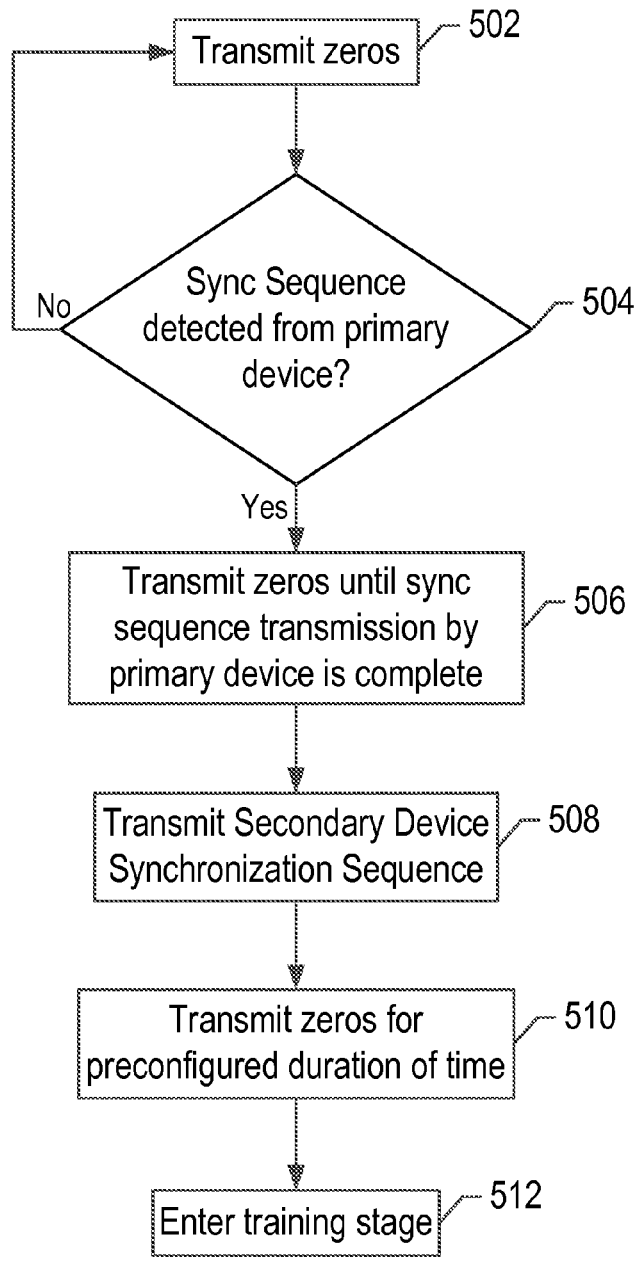
FIG. 5 illustrates a flow diagram of an example process of a secondary electronic device in a synchronization stage of link establishment for single pair Ethernet in accordance with one or more implementations.

FIG. 5 illustrates a flow diagram of an example process 500 of a secondary electronic device 102A in a synchronization stage of link establishment for single pair Ethernet in accordance with one or more implementations. For explanatory purposes, the example process 500 is primarily described herein with reference to the electronic device 102A of FIG. 1; however, the example process 500 is not limited to the electronic device 102A of FIG. 1, and the example process 500 may be performed by one or more components of the electronic device 102A. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

Upon entering the synchronization stage, the secondary electronic device 102A transmits zeros, e.g. packets with no data (502). If the secondary electronic device 102A does not detect the primary device synchronization sequence transmitted by the primary electronic device 102D (504), the secondary electronic device 102A continues to transmit zeros (502). If the secondary electronic device 102A detects the primary device synchronization sequence transmitted by the primary electronic device 102D (504), the secondary electronic device 102A transmits zeros until the secondary electronic device 102A no longer detects the primary device synchronization sequence, e.g. until transmission of the primary device synchronization sequence is completed by the primary electronic device 102D (506). In one or more implementations, the secondary electronic device 102A may utilize a matched filter-based correlator to detect the primary device synchronization sequence.

When the transmission of the primary device synchronization sequence is complete (506), the secondary electronic device 102A transmits its secondary device synchronization sequence to the primary electronic device 102D (508). The secondary device synchronization sequence is based on a wideband PAM-2 pseudo-noise (PN) sequence, such as a PN sequence with a period of 255 ($2^8-1$) and generally has a good/strong autocorrelation characteristic. The secondary device synchronization sequence is specific to the secondary electronic device 102A, i.e. is not the same as the primary device synchronization sequence, and is generated using an eighth degree polynomial that is specific to the secondary electronic device 102A, such as $g_S(x)=1+x^4+x^5+x^6+x^8$. An example secondary device synchronization sequence generator is discussed further below with respect to FIG. 7.

Upon completing transmission of the secondary device synchronization sequence, the secondary electronic device 102A transmits zeros for a preconfigured duration of time that is pre-shared, or otherwise known by, the primary electronic device 102D, such as a duration of four microseconds (510). As discussed above, the primary electronic device 102D also transmits zeros for the preconfigured duration of time, such that both electronic devices 102A,D enter the training stage synchronously (512).

Figure 6:
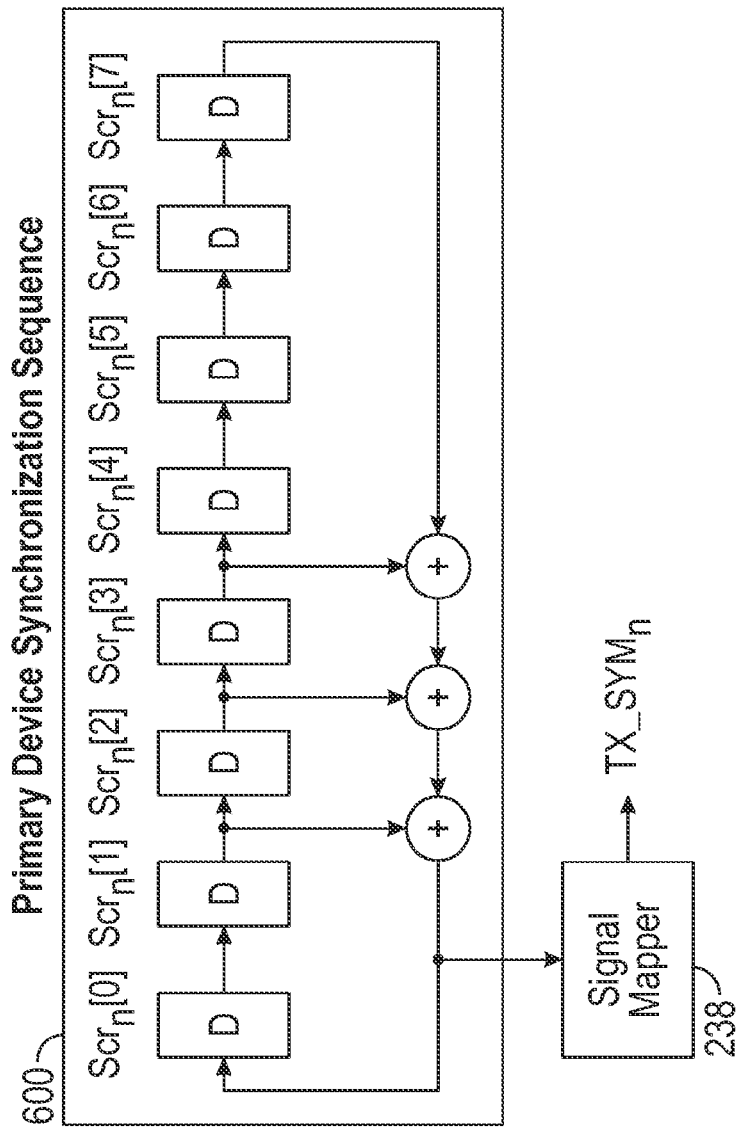
FIG. 6 illustrates an example primary device synchronization sequence generator in accordance with one or more implementations.

FIG. 6 illustrates an example primary device synchronization sequence generator 600 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The primary device synchronization sequence generator 600 is illustrated in FIG. 6 as including a linear feedback shift register with taps after the second bit ($Scr_n[1]$), the third bit ($Scr_n[2]$), and the fourth bit ($Scr_n[3]$). Thus, the polynomial representation of the linear feedback shift register of the primary device synchronization sequence generator 600 is $g_P(x)=1+x^2+x^3+x^4+x^8$. Thus, the primary device synchronization sequence has strong autocorrelation characteristics and can be detected by the secondary electronic device 102A even under the worst case narrow band interference (NBI) or burst noise conditions. The output ($Scr_n[0]$) of the primary device synchronization sequence generator 600 is passed to the signal mapper 238. The signal mapper 238 maps the output to a PAM-2 signal. For example, an $Scr_n[0]$ value of 0 may be mapped to +1 and an $Scr_n[0]$ value of 1 may be mapped to −1.

Figure 7:
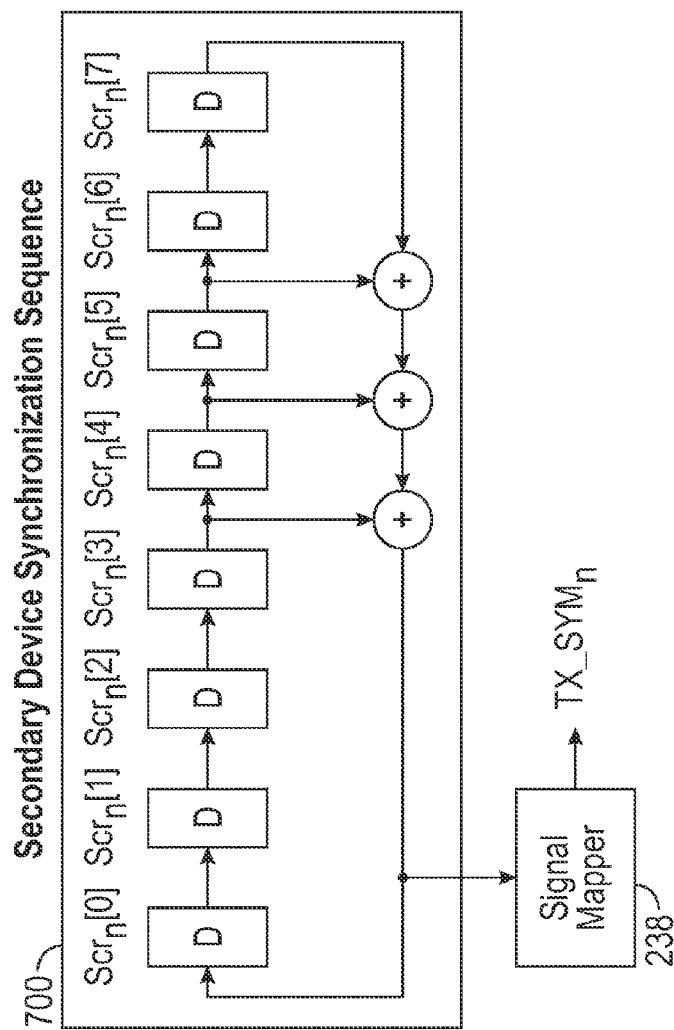
FIG. 7 illustrates an example secondary device synchronization sequence generator in accordance with one or more implementations.

FIG. 7 illustrates an example secondary device synchronization sequence generator 700 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The secondary device synchronization sequence generator 700 is illustrated in FIG. 7 as including a linear feedback shift register with taps after the fourth bit ($Scr_n[3]$), the fifth bit ($Scr_n[4]$), and the sixth bit ($Scr_n[5]$). Thus, the polynomial representation of the linear feedback shift register of the secondary device synchronization sequence generator 700 is $g_S(x)=1+x^4+x^5+x^6+x^8$. Thus, the primary device synchronization sequence has strong autocorrelation characteristics and can be detected by the primary electronic device 102D even under the worst case narrow band interference (NBI) or burst noise conditions. The output ($Scr_n[0]$)

of the secondary device synchronization sequence generator 700 is passed to the signal mapper 238. The signal mapper 238 maps the output to a PAM-2 signal. For example, an $Scr_n[0]$ value of 0 may be mapped to +1 and an $Scr_n[0]$ value of 1 may be mapped to −1.

Figure 8:
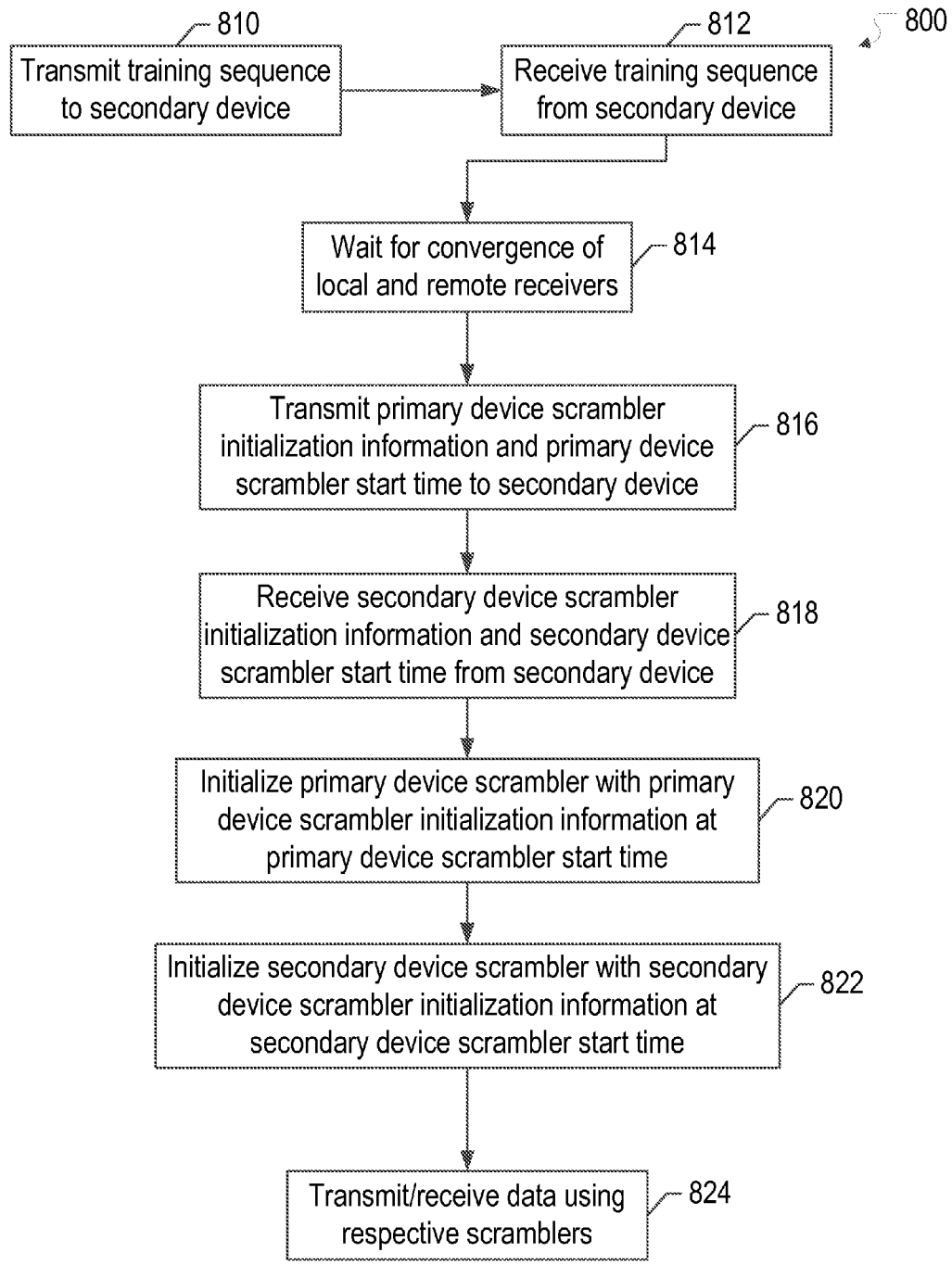
FIG. 8 illustrates a flow diagram of an example process of a primary electronic device in a training stage of link establishment for single pair Ethernet in accordance with one or more implementations.

FIG. 8 illustrates a flow diagram of an example process 800 of a primary electronic device 102D in a training stage of link establishment for single pair Ethernet in accordance with one or more implementations. For explanatory purposes, the example process 800 is described herein with reference to the electronic device 102D of FIGS. 1-2; however, the example process 800 is not limited to the electronic device 102D of FIG. 1-2, and the example process 800 may be performed by one or more components of the electronic device 102D. Further for explanatory purposes, the blocks of the example process 800 are described herein as occurring in serial, or linearly. However, multiple blocks of the example process 800 may occur in parallel. In addition, the blocks of the example process 800 need not be performed in the order shown and/or one or more of the blocks of the example process 800 need not be performed.

Upon entering the training stage, the primary electronic device 102D transmits a training sequence, such as one or more PAM2 training frames, to the secondary electronic device 102A (810). The training sequence may utilize, for example, the training frame format discussed further below with respect to FIG. 11, the information field formats discussed further below with respect to FIG. 12, and/or the primary electronic device 102D message identifier values discussed further below with respect to FIG. 13. The primary electronic device 102D receives a training sequence from the secondary electronic device 102A (812). The received training sequence may utilize the aforementioned formats and/or the secondary electronic device 102A message identifier values discussed further below with respect to FIG. 14.

The primary electronic device 102D waits for the convergence of its receiver (indicating the same to the secondary electronic device 102A via the aforementioned training sequence), and waits for a training frame indicating that the receiver of the secondary electronic device 102A has been converged (814). The primary electronic device 102D transmits a training frame that includes scrambler initialization information for the scrambler 236 of the primary electronic device 102D, such as a scrambler seed, and another training frame that includes data mode timing information indicating a time that the primary electronic device 102D will initialize the scrambler 236 and enter the data mode (816).

The primary electronic device 102D receives a training frame from the secondary electronic device 102A that includes scrambler initialization information for the scrambler of the secondary electronic device 102A, such as a scrambler seed, and another training frame that includes secondary device data mode timing information indicating a time that the secondary electronic device 102A will initialize its scrambler and enter the data mode (818). The primary electronic device 102D initializes the scrambler 236 with the primary device scrambler initialization information at the indicated time and switches to the data mode (820). The primary electronic device 102D initializes the descrambler 246 with the received secondary device scrambler initialization information at the time indicated by the secondary electronic device 102A (822). The primary electronic device 102D transmits and receives data with the secondary electronic device 102A using the initialized scrambler 236 and descrambler 246 (824).

Figure 9:
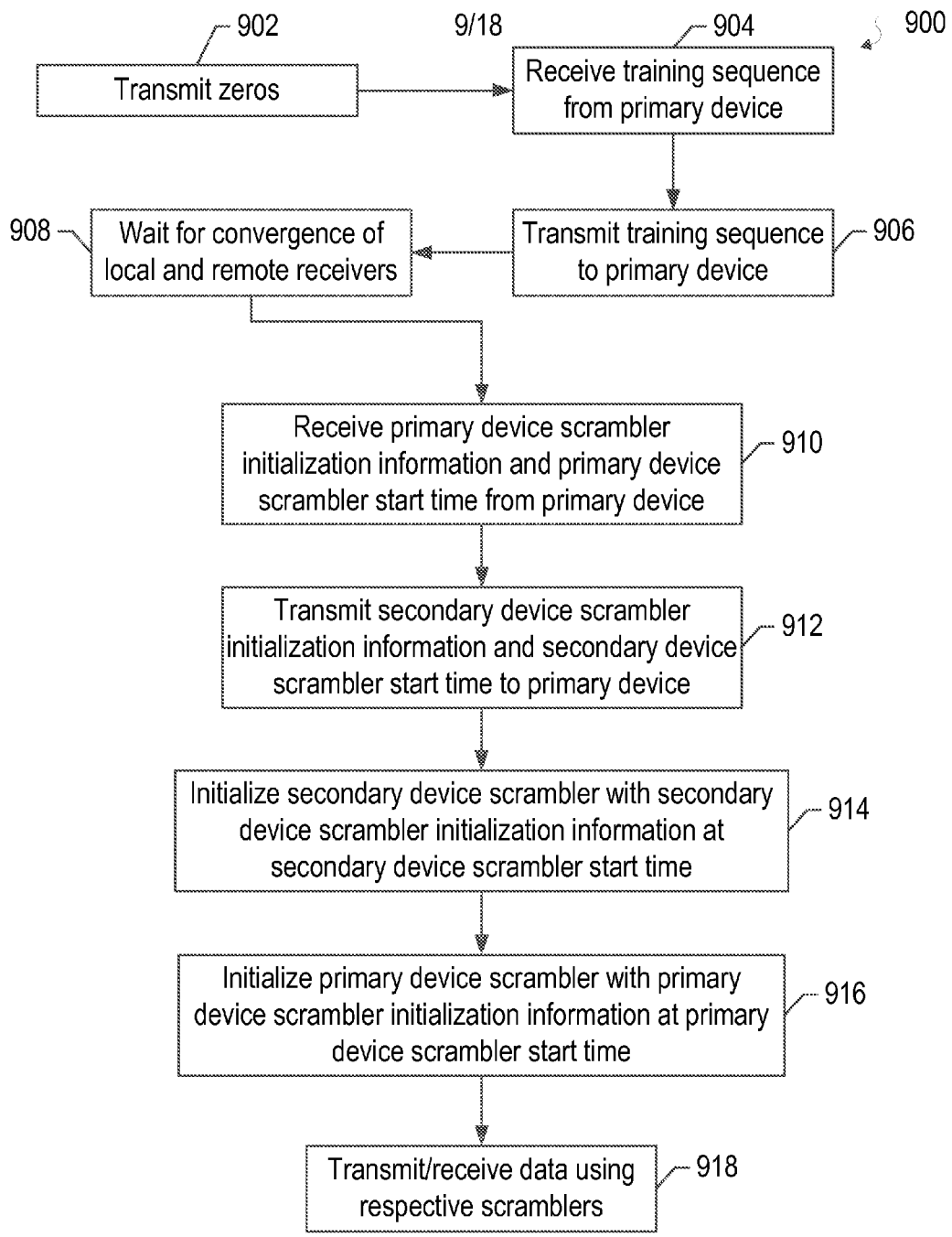
FIG. 9 illustrates a flow diagram of an example process of a secondary electronic device in a training stage of link establishment for single pair Ethernet in accordance with one or more implementations.

FIG. 9 illustrates a flow diagram of an example process of a secondary electronic device 102A in a training stage of link establishment for single pair Ethernet in accordance with one or more implementations. For explanatory purposes, the example process 900 is described herein with reference to the electronic device 102A of FIG. 1; however, the example process 900 is not limited to the electronic device 102A of FIG. 1, and the example process 900 may be performed by one or more components of the electronic device 102A. Further for explanatory purposes, the blocks of the example process 800 are described herein as occurring in serial, or linearly. However, multiple blocks of the example process 800 may occur in parallel. In addition, the blocks of the example process 800 need not be performed in the order shown and/or one or more of the blocks of the example process 800 need not be performed.

Upon entering the training stage, the secondary electronic device 102A transmits zeros (902) until a training frame, or sequence, is received from the primary electronic device 102D that indicates that the secondary electronic device 102A can start transmitting training frames (904). Upon receiving a training frame from the primary electronic device 102D that indicates that the secondary electronic device 102A can start transmitting training frames (904), the secondary electronic device 102A transmits a training sequence to the primary electronic device 102D (906), e.g. using the training frame format discussed further below with respect to FIG. 11, the information field formats discussed further below with respect to FIG. 12, and/or the secondary electronic device 102A message identifier values discussed further below with respect to FIG. 14.

The secondary electronic device 102A waits for the convergence of its receiver (indicating the same to the primary electronic device 102D via the aforementioned training sequence), and waits for a training frame indicating that the receiver of the primary electronic device 102D has converged (908). The secondary electronic device 102A receives a training frame from the primary electronic device 102D that includes scrambler initialization information for the scrambler 236 of the primary electronic device 102D, such as a scrambler seed, and another training frame that includes primary device data mode timing information indicating a time that the primary electronic device 102D will initialize its scrambler 236 and enter the data mode (910).

The secondary electronic device 102A transmits a training frame that includes scrambler initialization information for its scrambler, such as a scrambler seed, and another training frame that includes secondary device data mode timing information indicating a time that the secondary electronic device 102A will initialize its scrambler and enter the data mode (912). The secondary electronic device 102A initializes its scrambler with the secondary device scrambler initialization information at the indicated time and switches to the data mode (914). The secondary electronic device 102A initializes its descrambler with the received primary device scrambler initialization information at the time indicated by the primary electronic device 102D (916). The secondary electronic device 102A transmits and receives data with the primary electronic device 102D using its initialized scrambler and descrambler (918).

Figure 10:
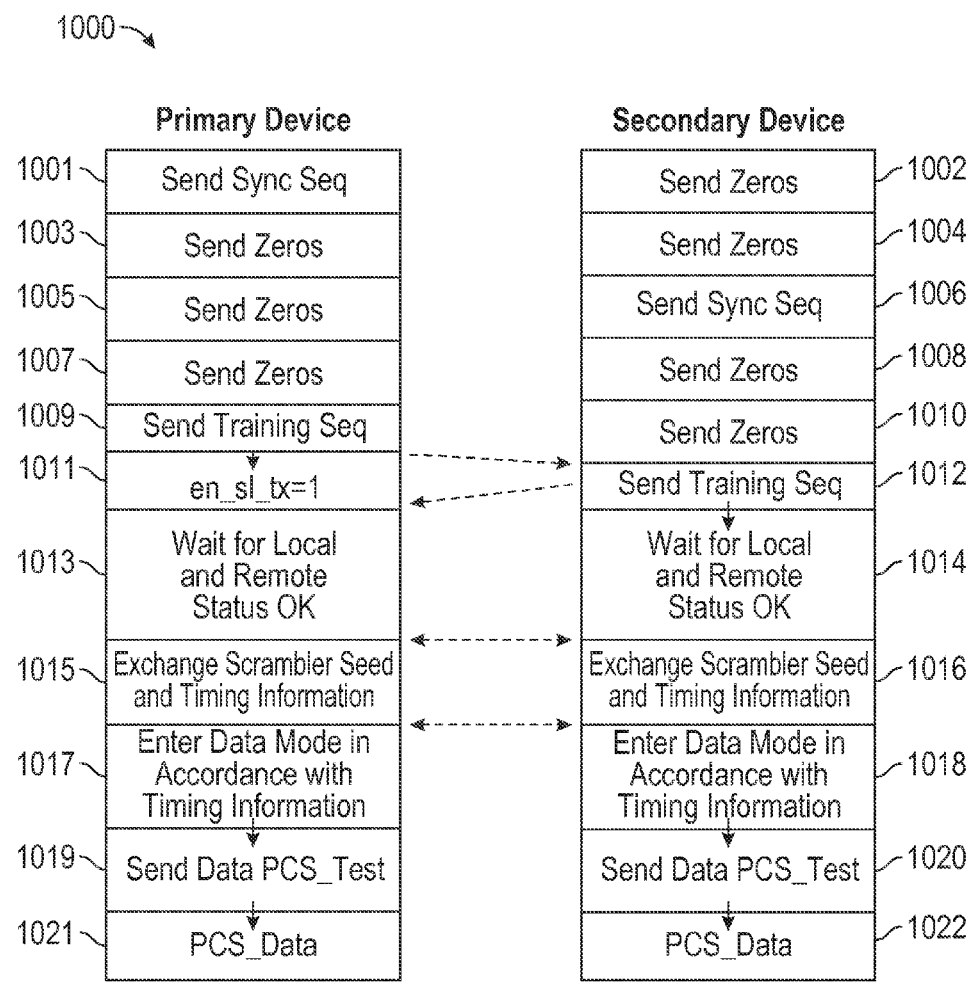
FIG. 10 illustrates an example timing diagram for link establishment for single pair Ethernet in accordance with one or more implementations.

FIG. 10 illustrates an example timing diagram 1000 for link establishment for single pair Ethernet in accordance with one or more implementations. For explanatory purposes, the example timing diagram 1000 is described herein with reference to the electronic devices 102A,D of FIG. 1; however, the example timing diagram 1000 is not limited to the electronic devices 102A,D of FIG. 1, and the example timing diagram 1000 may be performed by one or more components of one or more of the electronic devices 102A, D. Further for explanatory purposes, the blocks of the example timing diagram 1000 are described herein as occurring in serial, or linearly. However, multiple blocks of the example timing diagram 1000 may occur in parallel. In addition, the blocks of the example timing diagram 1000 need not be performed in the order shown and/or one or more of the blocks of the example timing diagram 1000 need not be performed.

When the PHY module 220 of the primary electronic device 102D is enabled, the primary electronic device 102D enters the synchronization stage by transmitting its synchronization sequence (1001). When the PHY of the secondary electronic device 102A is enabled, the secondary electronic device 102A enters the synchronization stage by transmitting zeros (1002, 1004). Upon completing the transmission of its synchronization sequence (1001), the primary electronic device 102D transmits zeros (1003, 1005). During this time the secondary electronic device 102A transmits its synchronization sequence (1006). Both electronic devices 102A,D then transmit zeros for a preconfigured duration of time (1007, 1008), and enter the training stage synchronously.

The primary electronic device 102D initiates the training stage by transmitting its training sequence (1009). The secondary electronic device 102A transmits zeros (1010) until it receives an indication from the primary electronic device 102D that it may begin transmitting training frames (1011). At that time, the secondary electronic device 102A begins transmitting its training sequence (1012). Both electronic devices 102A,D wait for their respective receivers, and each other's receiver, to converge (1013, 1014). The electronic devices 102A,D then exchange scrambler initialization information and data mode timing information for initializing the respective scramblers and entering the data mode (1015, 1016). In one or more implementations, the timing information may include a counter value, or a countdown value, that indicates when the respective electronic devices 102A,D will initialize their respective scramblers and enter the data mode.

The electronic devices 102A,D enter the data mode in accordance with the provided, and received, data mode timing information (1017, 1018). For example, the primary electronic device 102D may initialize the scrambler 236 and enter the data mode at the time indicated by the data mode timing information provided to the secondary electronic device 102A, and the primary electronic device 102D may initialize the descrambler 246 at the time indicated by the data mode timing information received from the secondary electronic device 102A. The electronic devices 102A,D then enter the data mode and transmit data, e.g. using the initialized scramblers (1019-1022).

Figure 11:
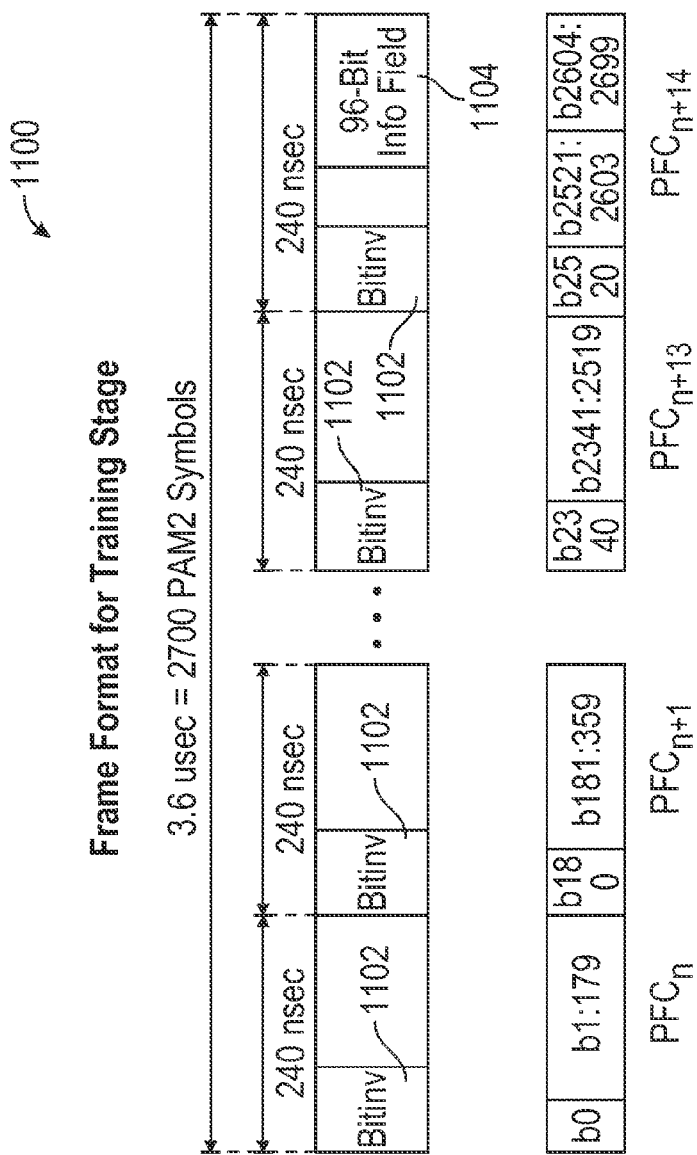
FIG. 11 illustrates an example frame format for a training stage of link establishment for single pair Ethernet in accordance with one or more implementations.

FIG. 11 illustrates an example frame format 1100 for the training stage of link establishment for single pair Ethernet in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example frame format 1100 illustrates a training frame, such as a PAM2 training frame. The frame format includes a one bit inversion 1102 every 240 nanoseconds, or every 180 PAM2 symbols. The training frame is 3.6 microseconds and is aligned with a data mode FEC frame. Each training frame includes a 96-bit information field 1104 at the end of the frame. An example format of the information field 1104 is discussed further below with respect to FIG. 12, example information field messages of a primary electronic device 102D are discussed further below with respect to FIG. 13, and example information field messages of a secondary electronic device 102A are discussed further below with respect to FIG. 14.

Figure 12:
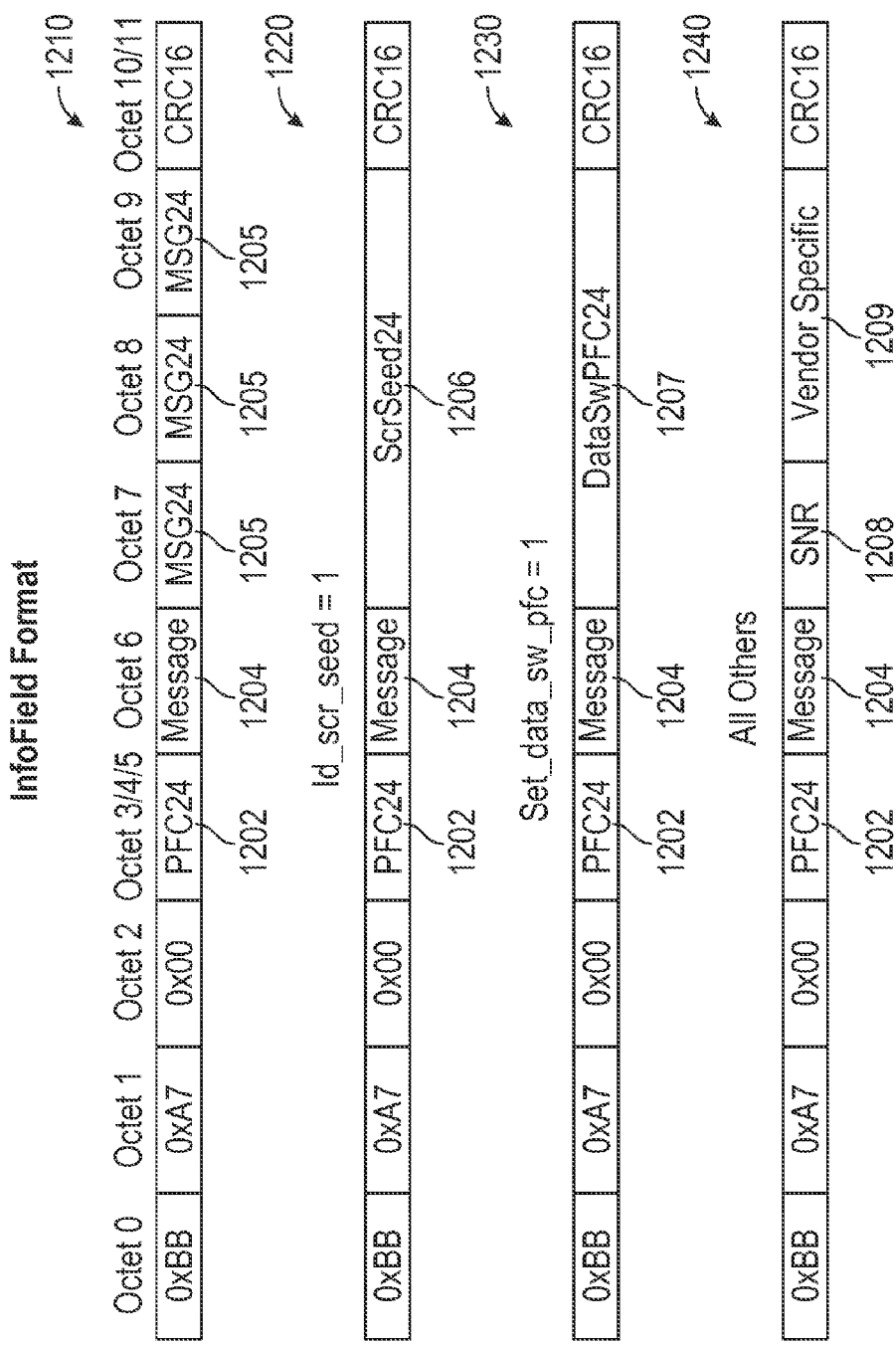
FIG. 12 illustrates example information field formats for a training stage of link establishment for single pair Ethernet in accordance with one or more implementations.

FIG. 12 illustrates example information field formats 1210-1240 for the training stage of link establishment for single pair Ethernet in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

Messages formatted using the information field formats 1210-1240 each lasts at least 256 frames (less than 1 microsecond) to ensure detection by the link partner. The information field formats 1210-1240 include a 24-bit partial RS frame count (PFC) value 1202 that is incremented by 15 (or 24) per frame to avoid wrap-around ambiguity. That is, with a 24-bit PFC it takes less than four seconds without counter wrap-around ($2^{24}*3.6$ microseconds/15=4.0265 seconds). The information field formats 1210-1240 each include an eight bit message identifier 1204 that is used to indicate the type of data, if any, carried in the four subsequent octets, and to transition through the PAM2 training states. Example values of the message identifier 1204 for a primary electronic device 102D are discussed further below with respect to FIG. 13 and example values for the message identifier 1204 of a secondary electronic device 102A are discussed further below with respect to FIG. 14.

The general information field format 1210 includes three message octets 1205 that can be used to transmit any type of data, such as data mode capabilities, optional parameters, and/or scrambler initialization information. For example, in the scrambler information field format 1220 all three octets are used to transmit scrambler information 1206, such as the scrambler seed or the initial state of the data mode sidestream scrambler, filling up the 24 least significant bits and assuming that the most significant bits (if any) are zero. In the timing information field format 1230 all three octets are used to transmit data mode timing information 1207, such as the exact time when the device will initialize its scrambler and switch to the data mode. In the vendor specific information field format 1240, one of the octets is used to transmit a signal to noise ratio (SNR) 1208 and the other two octets are used to transmit vendor specific information 1209.

FIG. 13 illustrates a table 1300 of example information field message identifier 1204 values transmitted by a primary electronic device 102D during the training stage of link establishment for single pair Ethernet in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The table 1300 of example information field message identifier 1204 values transmitted by a primary electronic device 102D includes a two-bit training state identifier 1302 that is used to transition through the training states, such as the PAM2 training states. The table 1300 includes a local receiver status bit 1304 which indicates when the local receiver has converged. The table 1300 includes an enable secondary device transmission bit 1306, which is set by the primary electronic device 102D to indicate to the secondary electronic device 102A when it should start transmitting training frames. The table 1300 includes a scrambler seed bit 1308 to indicate when the subsequent octets will include scrambler initialization information for the scrambler 236 of the primary electronic device 102D, such as a scrambler seed of the primary electronic device 102D, and a scrambler seed acknowledgement bit 1310 to indicate that the primary electronic device 102D has received the scrambler initialization information of the secondary electronic device 102A.

The table 1300 also includes a data mode timing information bit 1312 to indicate when the subsequent octets will include data mode timing information, such as an exact time when the primary electronic device 102D will initialize the scrambler 236 and enter the data state, and a data mode timing information acknowledgment bit 1314 to indicate that the primary electronic device 102D has received the data mode timing information of the secondary electronic device 102A, e.g. the time when the primary electronic device 102D should initialize the descrambler 246 with the scrambler initialization information received from the secondary electronic device 102A. In one or more implementations the timing information is relative to, and/or in terms of, the 24-bit PFC value 1202, such as a PFC counter value. Thus, the primary electronic device 102D initializes the descrambler 246 with the received scrambler initialization information at the beginning, or end, of the specified PFC count.

FIG. 14 illustrates a table 1400 of example information field message identifier 1204 values transmitted by a secondary electronic device 102A during the training stage of link establishment for single pair Ethernet in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The table 1400 of example information field message identifier 1204 values transmitted by a secondary electronic device 102A includes a two-bit training state identifier 1402 that is used to transition through the training states, such as the PAM2 training states. The table 1400 includes a local receiver status bit 1404 which indicates when the local receiver has converged. The table 1400 includes a timing lock bit 1406 which is set to indicate timing convergence. The table 1400 includes a scrambler seed bit 1408 to indicate when the subsequent octets will include scrambler initialization information for the scrambler of the secondary electronic device 102A, such as a scrambler seed of the secondary electronic device 102A, and a scrambler seed acknowledgement bit 1410 to indicate that the secondary electronic device 102A has received the scrambler initialization information of the primary electronic device 102D.

The table 1400 also includes a data mode timing information bit 1412 to indicate when the subsequent octets will include data mode timing information, such as an exact time when the secondary electronic device 102A will initialize its scrambler and enter the data state, and a data mode timing information acknowledgment bit 1414 to indicate that the secondary electronic device 102A has received the data mode timing information of the primary electronic device 102D, e.g. the time when the secondary electronic device 102A should initialize its descrambler with the scrambler initialization information received from the primary electronic device 102D. In one or more implementations the data mode timing information is relative to, and/or in terms of, the 24-bit PFC value 1202, such as a PFC counter value. Thus, the secondary electronic device 102A initializes its descrambler with the received scrambler initialization information at the beginning, or end, of the specified PFC count.

Figure 15:
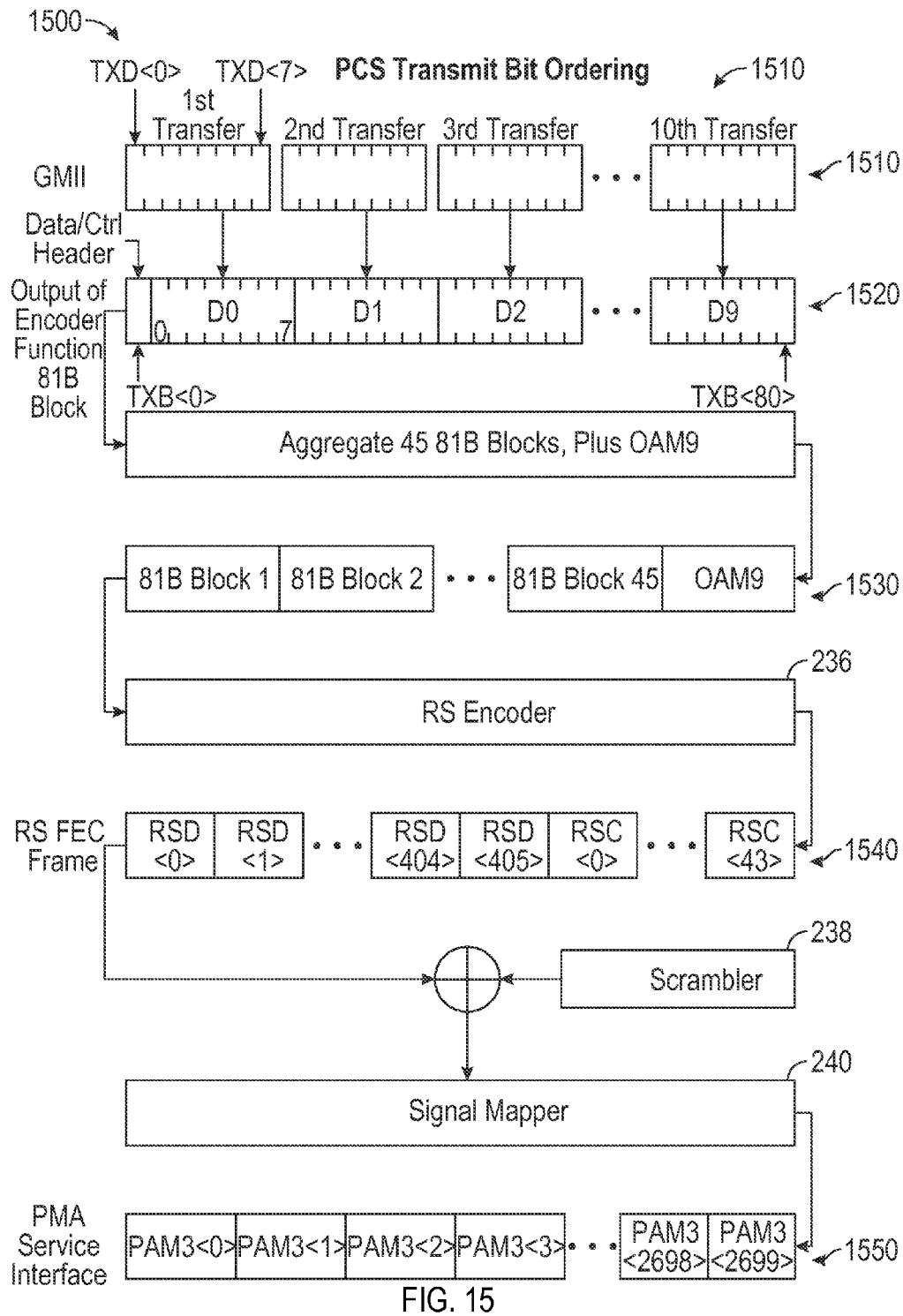
FIG. 15 illustrates an example bit ordering of a physical coding sublayer (PCS) transmit module in accordance with one or more implementations.

FIG. 15 illustrates an example bit ordering 1500 of a physical coding sublayer (PCS) transmit module 230 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example bit ordering 1500 begins with 80-bit data blocks 1510 that are appended with a header and encoded to 81-bit data blocks 1520 by the PCS encoder 232. Forty-five 81-bit data blocks plus a 9-bit operations, administration, and maintenance (OAM) block are aggregated to form the RS encoder 234 payloads 1530. The RS encoder 234 generates RS symbols 1540 (or codewords) from the payloads. The scrambler 236 performs an XOR operation on the RS symbols 1540 and the scrambler sequence and outputs the scrambled data blocks to the signal mapper 238. Thus, the OAM blocks (in addition to the data blocks) are encoded by the RS encoder 234 and scrambled by the scrambler 236. The signal mapper 238 maps three bits of the scrambled data blocks to two ternary symbols to generate the PAM symbols 1550.

Figure 16:
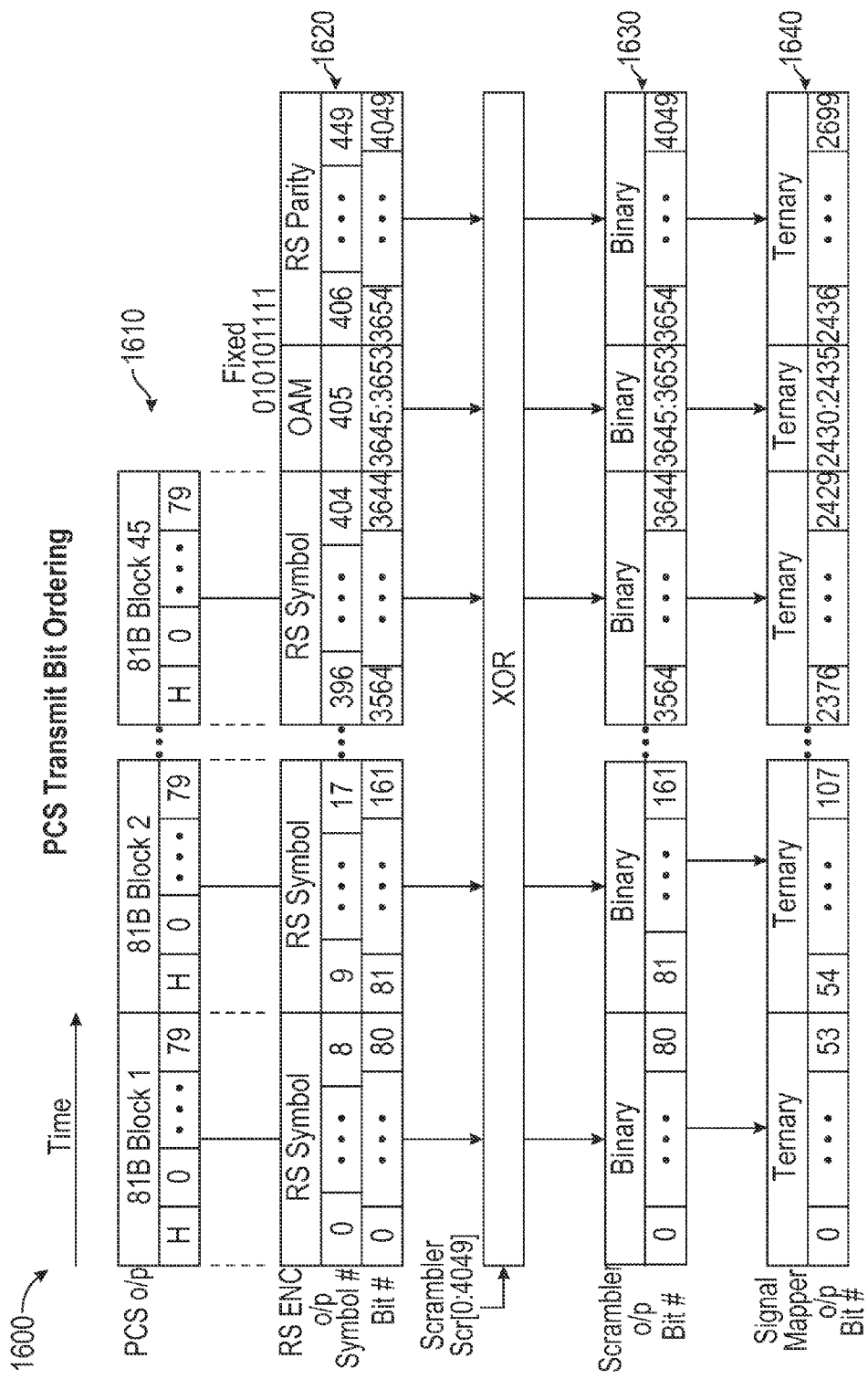
FIG. 16 further illustrates an example bit ordering of a physical coding sublayer (PCS) transmit module in accordance with one or more implementations.

FIG. 16 further illustrates an example bit ordering 1600 of a physical coding sublayer (PCS) transmit module 230 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example bit ordering 1600 includes the data blocks 1610 that are output by the PCS encoder 232 and are mapped to the RS symbols 1620 that are output by the RS encoder 234. The RS symbols 1620 are over a Galois Field (GF) of $2^9$, i.e. $b_8 \alpha^8 + b_7 \alpha^7 + b_6 \alpha^6 + \ldots + b_1 \alpha + b_0$. The RS symbols 1620 are XOR'd with the scrambler sequence generated by the scrambler 236 to generate the scrambled data blocks 1630. The scrambled data blocks 1630 are mapped to ternary symbols 1640 by the signal mapper 238.

Figure 17:
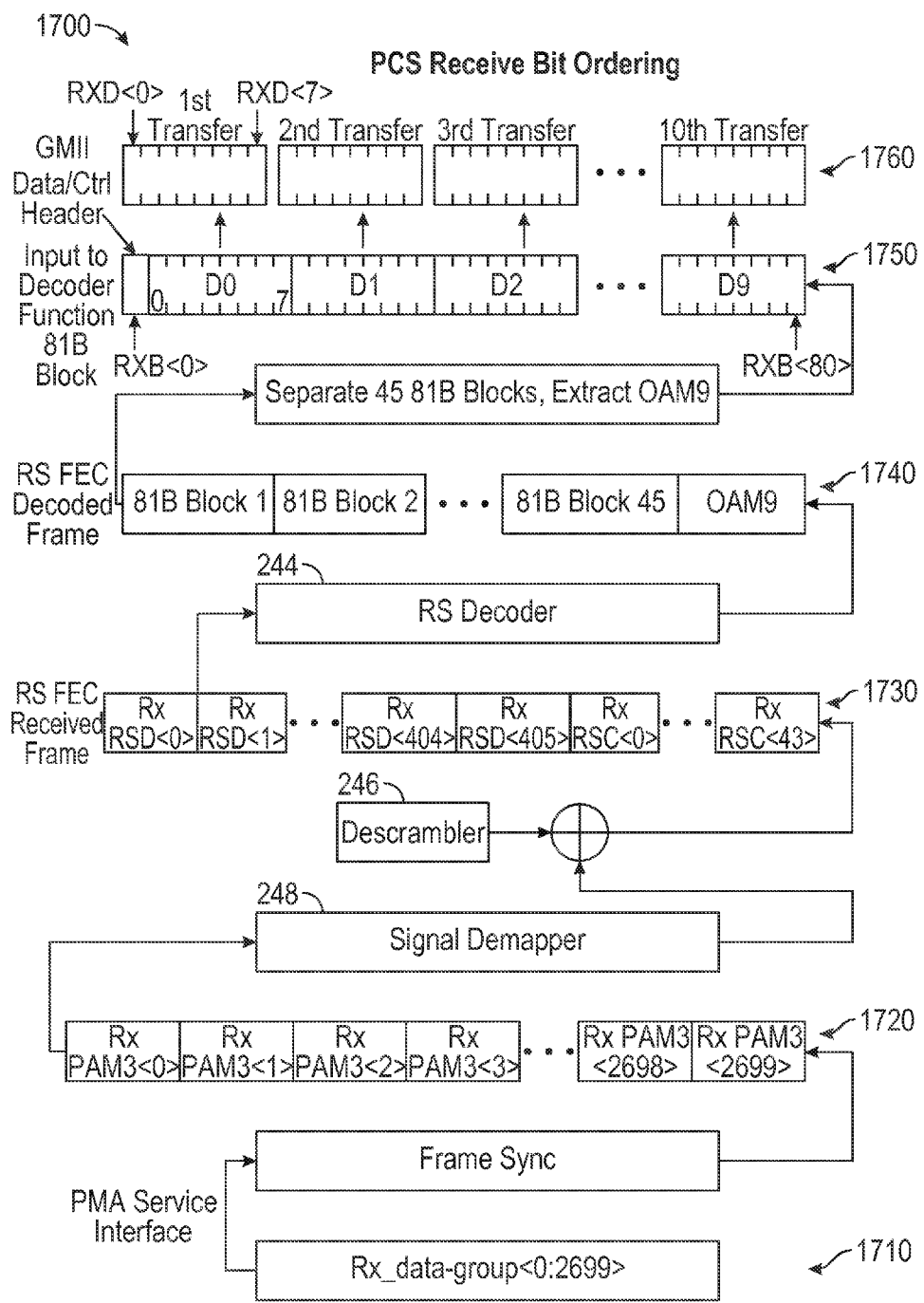
FIG. 17 illustrates an example bit ordering of a physical coding sublayer (PCS) receive module in accordance with one or more implementations.

FIG. 17 illustrates an example bit ordering 1700 of a physical coding sublayer (PCS) receive module 240 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example bit ordering 1700 begins with a received signal 1710 that is frame synchronized to produce PAM symbols 1720. The signal demapper 248 demaps the PAM symbols to scrambled data blocks which are XOR'd by the descrambler 246 with the link partner's scramble sequence to produce the RS symbols 1730. The RS decoder 244 decodes the RS symbols 1730 to obtain the aggregated data blocks that include forty-five 81-bit data blocks plus the 9-bit OAM block 1740. The OAM block is extracted from the aggregated data blocks 1740 and the remaining data blocks are separated into 81-bit bocks 1750. The PCS decoder 242 removes the header to decode the 81-bit blocks to 80-bit blocks 1760.

Figure 18:
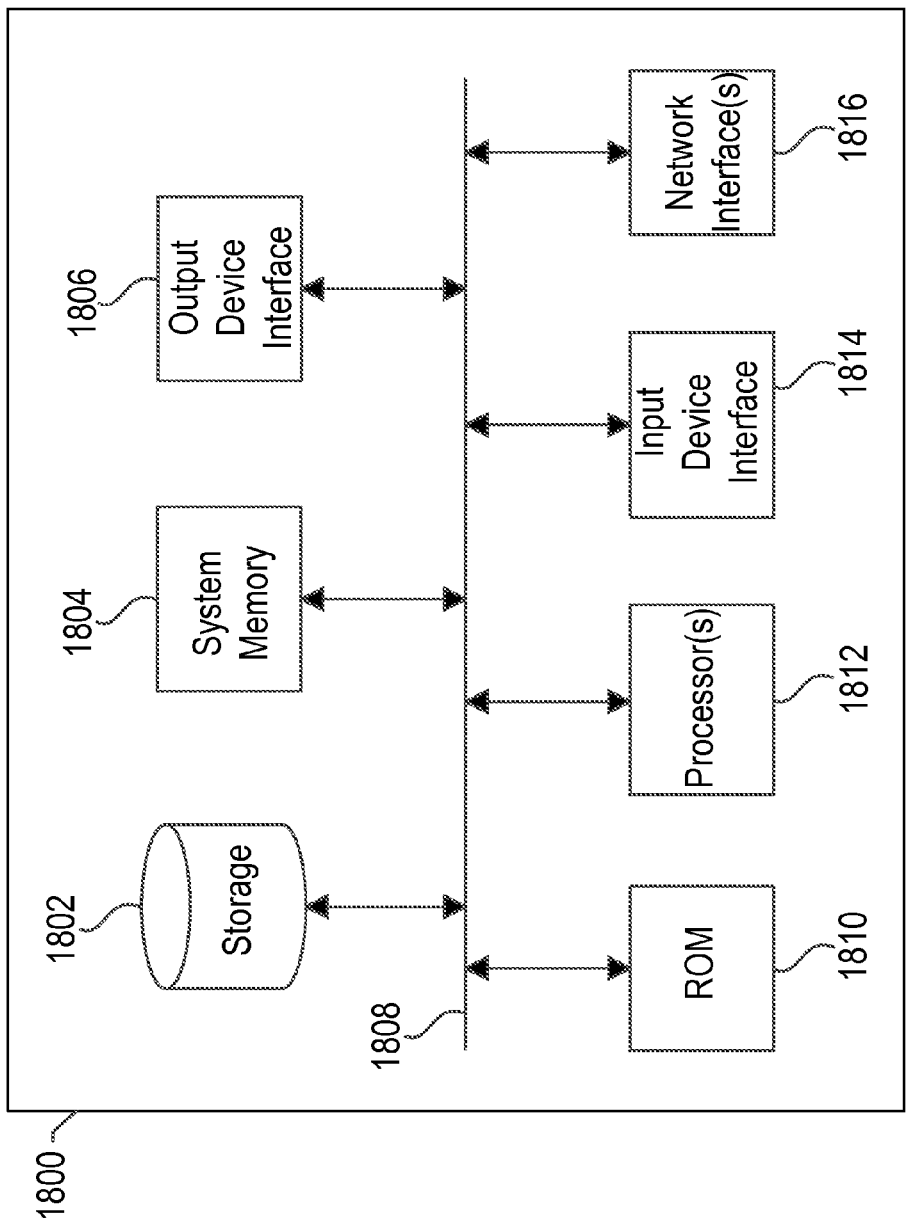
FIG. 18 conceptually illustrates an electronic system with which one or more implementations of the subject technology may be implemented.

FIG. 18 conceptually illustrates an electronic system 1800 with which one or more implementations of the subject technology may be implemented. The electronic system 1800, for example, may be, or may be coupled to, a powertrain system, a chassis system, a telematics system, an entertainment system, a camera system, a sensor system, such as a lane departure system, a diagnostics system, a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 1800 can be, and/or can be a part of, one or more of the electronic devices 102A-D. Such an electronic system includes various types of computer readable media and interfaces for various other types of computer readable media. The electronic system 1800 includes a bus 1808, one or more processor(s) 1812, a system memory 1804 or buffer, a read-only memory (ROM) 1810, a permanent storage device 1802, an input device interface 1814, an output device interface 1806, and one or more network interface(s) 1816, or subsets and variations thereof.

The bus 1808 collectively represents all system, peripheral, and chipset buses that communicatively connect the numerous internal devices of the electronic system 1800. In one or more implementations, the bus 1808 communicatively connects the one or more processor(s) 1812 with the ROM 1810, the system memory 1804, and the permanent storage device 1802. From these various memory units, the one or more processor(s) 1812 retrieve instructions to execute and data to process in order to execute the processes of the subject disclosure. The one or more processor(s) 1812 can be a single processor or a multi-core processor in different implementations.

The ROM 1810 stores static data and instructions that are needed by the one or more processor(s) 1812 and other modules of the electronic system 1800. The permanent storage device 1802, on the other hand, may be a read-and-write memory device. The permanent storage device 1802 may be a non-volatile memory unit that stores instructions and data even when the electronic system 1800 is off. In one or more implementations, a mass-storage device (such as a magnetic or optical disk and its corresponding disk drive) may be used as the permanent storage device 1802.

In one or more implementations, a removable storage device (such as a floppy disk, flash drive, and its corresponding disk drive) may be used as the permanent storage device 1802. Like the permanent storage device 1802, the system memory 1804 may be a read-and-write memory device. However, unlike the permanent storage device 1802, the system memory 1804 may be a volatile read-and-write memory, such as random access memory. The system memory 1804 may store any of the instructions and data that one or more processor(s) 1812 may need at runtime. In one or more implementations, the processes of the subject disclosure are stored in the system memory 1804, the permanent storage device 1802, and/or the ROM 1810. From these various memory units, the one or more processor(s) 1812 retrieve instructions to execute and data to process in order to execute the processes of one or more implementations.

The bus 1808 also connects to the input and output device interfaces 1814 and 1806. The input device interface 1814 enables a user to communicate information and select commands to the electronic system 1800. Input devices that may be used with the input device interface 1814 may include, for example, alphanumeric keyboards and pointing devices (also called "cursor control devices"). The output device interface 1806 may enable, for example, the display of images generated by the electronic system 1800. Output devices that may be used with the output device interface 1806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 18, the bus 1808 also couples the electronic system 1800 to one or more networks (not shown), and/or one or more of the electronic devices 102A-D, through one or more network interface(s) 1816. One or more network interface(s) may include an Ethernet interface, a WIFI interface, a multimedia over coax alliance (MoCA) interface, a reduced gigabit media independent interface (RGMII), or generally any interface for connecting to a network. The one or more network interfaces 1816 may include, or may be coupled to, a physical layer module, such as the PHY module 220. In this manner, the electronic system 1800 can be a part of one or more networks of computers (such as a local area network ("LAN"), a wide area network ("WAN"), or an Intranet, or a network of networks, such as the Internet. Any or all components of the electronic system 1800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A primary device comprising:
    at least one processor circuit configured to:
        transmit a first synchronization sequence to a secondary device;
        detect a second synchronization sequence transmitted by the secondary device, the second synchronization sequence differing from the first synchronization sequence;
        wait a first predetermined amount of time after completion of detection of the second synchronization sequence transmitted by secondary device, and, immediately upon expiration of the first predetermined amount of time, initiating a training stage, the first predetermined amount of time being known to the secondary device and the training stage comprising exchanging training frames with the secondary device; and
        enter a data mode for data transmissions upon completion of the training stage, the data transmissions being distinct from the training frames.

2. The primary device of claim 1, wherein the first and second synchronization sequences comprise pseudo-noise sequences that can be detected under narrow band interference (NBI) or burst noise conditions.

3. The primary device of claim 1, wherein the at least one processor circuit is further configured to:
    retransmit the first synchronization sequence to the secondary device when the second synchronization sequence is not detected after a second predetermined amount of time.

4. The primary device of claim 1, wherein the at least one processor circuit is configured to perform the detecting using a matched filter-based correlator.

5. The primary device of claim 1, wherein the at least one processor circuit, when in the training stage, is configured to:
    transmit primary device scrambler initialization information to the secondary device, and receive secondary device scrambler initialization information from the secondary device;
    transmit primary device data mode timing information to the secondary device, and receive secondary device data mode timing information from the secondary device;
    initialize a scrambler based at least in part on the primary device scrambler initialization information and at a first time indicated by the primary device data mode timing information; and
    initialize a descrambler based at least in part on the received secondary device scrambler initialization information and at a second time indicated by the received secondary device data mode timing information.

6. The primary device of claim 5, wherein the at least one processor circuit is further configured to:
    perform Reed-Solomon (RS) encoding on data for transmission;
    subsequently scramble the encoded data using the initialized scrambler;
    signal map the scrambled data to generate symbols; and
    transmit the symbols to the secondary device.

7. The primary device of claim 5, wherein the data for transmission comprises an operations, administration, and maintenance (OAM) block that is subsequently RS encoded and scrambled.

8. The primary device of claim 5, wherein the at least one processor circuit is further configured to:
    signal demap data received from the secondary device;
    perform Reed-Solomon (RS) decoding on the demapped data; and
    subsequently descramble the RS decoded data using the initialized descrambler.

9. The primary device of claim 1, wherein at least one of the training frames comprises information that indicates when to complete the training stage and enter the data mode.

10. The primary device of claim 1, wherein, when in the training stage, the at least one processor circuit is configured to:
    exchange the training frames with the secondary device, wherein each training frame comprises an information field that indicates state transitions for the training stage and a partial Reed Solomon (RS) frame count that is used to determine when to enter the data mode.

11. A method for link establishment by a secondary device, the method comprising:
    detecting a first synchronization sequence transmitted by a primary device;
    waiting a first predetermined amount of time upon completion of detecting the first synchronization sequence;
    transmitting a second synchronization sequence that differs from the first synchronization sequence after the first predetermined amount of time has elapsed; and
    waiting a second predetermined amount of time after completion of transmission of the second synchronization sequence, and then entering a two-level pulse amplitude modulation (PAM2) training stage.

12. The method of claim 11, wherein the first and second synchronization sequences comprise pseudo-noise sequences that can be detected under narrow band interference (NBI) or burst noise conditions.

13. The method of claim 11, wherein the PAM2 training stage comprises:
    waiting for the primary device to provide an indication that transmission of training frames may begin;
    upon receiving the indication, transmitting secondary device scrambler initialization information and secondary device data mode timing information to the primary device;
    receiving primary device scrambler initialization information and primary device data mode timing information from the primary device;
    initializing a scrambler based at least in part on the secondary device scrambler initialization information and at a first time indicated by the secondary device data mode timing information; and
    initializing a descrambler based at least in part on the received primary device scrambler initialization information and at a second time indicated by the primary device data mode timing information.

14. The method of claim 13, wherein the first time differs from the second time.

15. The method of claim 11, wherein the PAM2 training stage comprises:
    exchanging training frames with the primary device, wherein each training frame comprises an information field that indicates state transitions for the PAM2 training stage and a partial Reed Solomon (RS) frame count that is used to determine when to enter a data mode.

16. The method of claim 15, further comprising:
exchanging scrambler initialization information and data mode timing information with the primary device via the information fields of the training frames.

17. A computer program product comprising code stored in a non-transitory computer-readable storage medium, the code comprising:
code to detect a first synchronization sequence transmitted by a primary device;
code to wait a first predetermined amount of time upon completion of detecting the first synchronization sequence;
code to transmit a second synchronization sequence that differs from the first synchronization sequence after the first predetermined amount of time has elapsed; and
code to wait a second predetermined amount of time after completion of transmission of the second synchronization sequence, and then immediately entering a training stage, the second predetermined amount of time being known to the primary device and the training stage comprising exchanging training frames with the primary device; and
code to enter a data mode for data transmissions upon completion of the training stage, the data transmissions being distinct from the training frames.

18. The computer program product of claim 17, wherein the first and second synchronization sequences comprise pseudo-noise sequences that can be detected under narrow band interference (NBI) or burst noise conditions.

19. The computer program product of claim 17, wherein the code to enter the training stage comprises:
code to wait for the primary device to provide an indication that transmission of training frames may begin;
code to, upon receiving the indication, transmit secondary device scrambler initialization information and secondary device data mode timing information to the primary device;
code to receive primary device scrambler initialization information and primary device data mode timing information from the primary device;
code to initialize a scrambler based at least in part on the secondary device scrambler initialization information and at a first time indicated by the secondary device data mode timing information; and
code to initialize a descrambler based at least in part on the received primary device scrambler initialization information and at a second time indicated by the primary device data mode timing information, wherein the first time differs from the second time.

20. The computer program product of claim 17, wherein the training stage is a two-level pulse amplitude modulation (PAM2) training stage, and
each training frame comprises an information field that indicates state transitions for the training stage and a partial Reed Solomon (RS) frame count that is used to determine when to enter the data mode, and the code to enter the training stage comprises:
code to exchange scrambler initialization information and data mode timing information with the primary device via the information fields of the training frames.

* * * * *